1963X
C. F. Fisher. No Printed Specification Availabl
Alcohol Still.
Patented Jul. 12, 1813.
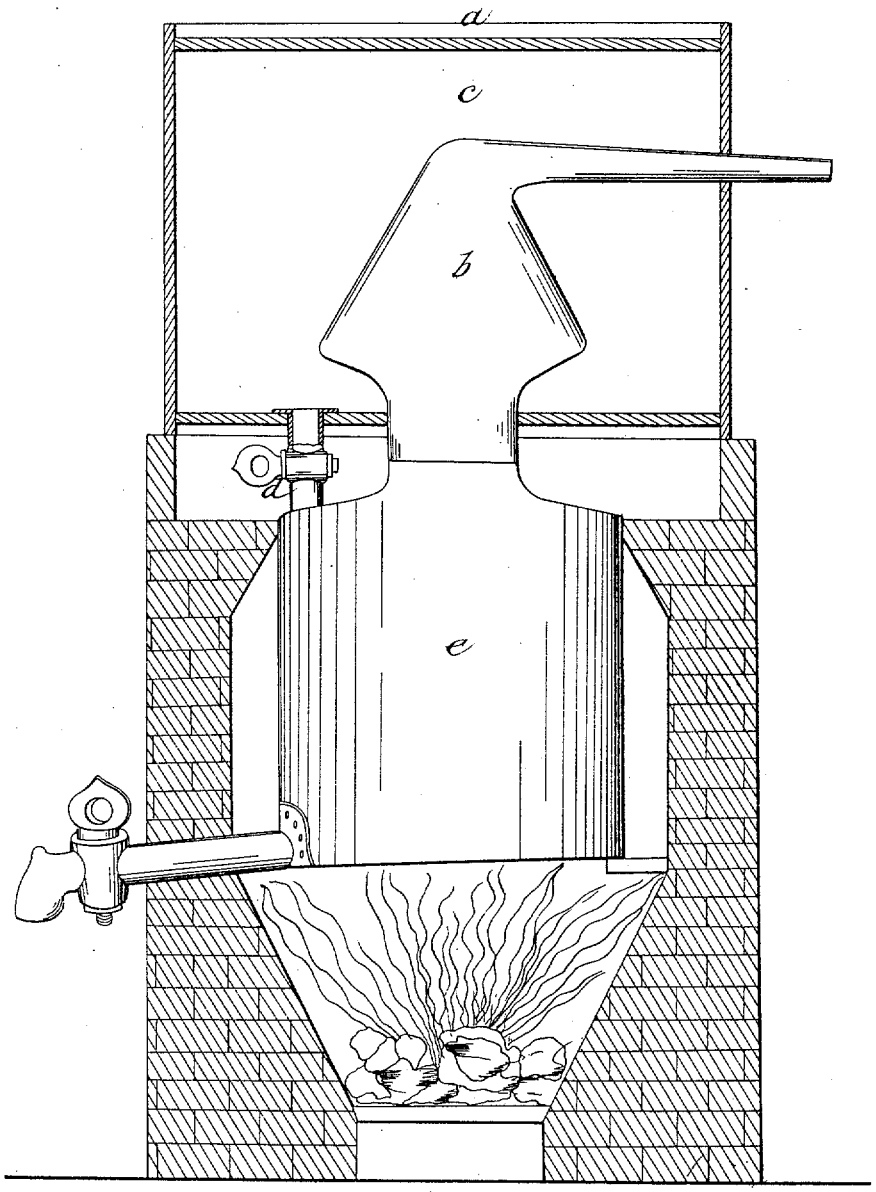
THE GRAPHIC CO. PHOTO-LITH. 39 & 41 PARK PLACE, N.Y.

Charles F. Fisher. 1963X

Letters Patent.

The Schedule referred to, in these Letters Patent, and making part of the same, containing a description in the words of the said Charles F. Fisher himself, of his improvement in stills.

"An Improvement in the art of distilling Spirituous Liquors, by which the distiller's beer in the condensing tub, is warmed by the still head. The Head being placed or included in the tub".

The mode of using or applying said improvements, is as follows:

---

The condensing tub and still are filled with the beer and the fire is applied to the still in the usual manner. As the distillation proceeds, the heat of the still head is communicated to the beer in the tub. When the still is run off, the beer in the condensing tub will be warmed, and must be drawn into the still below it, by means of a perpendicular tube, which can be opened or closed with a cock inserted into it. The warm beer being thus drawn into the still, the tube is closed and the tub again filled. Its contents will be heated and drawn off as before: so that the distillation will be continued with very little interruption.

Witnesses.

(signed) Chas. A. [illegible].

(signed) [illegible] Leitner.

(signed) Charles F. Fisher.

(212 words)

Received & Recorded [illegible]

[illegible]